United States Patent
Pai et al.

(10) Patent No.: US 11,567,541 B1
(45) Date of Patent: Jan. 31, 2023

(54) SELF-ILLUMINATING TOUCH ELECTRONIC PAPER DISPLAY DEVICE

(71) Applicants: Chih-Chiang Pai, Taoyuan (TW); Meng-Kuei Lin, Taoyuan (TW); Chin-Fong Lin, Taoyuan (TW); Chun-Hao Huang, Taoyuan (TW)

(72) Inventors: Chih-Chiang Pai, Taoyuan (TW); Meng-Kuei Lin, Taoyuan (TW); Chin-Fong Lin, Taoyuan (TW); Chun-Hao Huang, Taoyuan (TW)

(73) Assignee: YOUNG FAST OPTOELECTRONICS CO., LTD., Taoyuan (TW)

( * ) Notice: Subject to any disclaimer, the term of this patent is extended or adjusted under 35 U.S.C. 154(b) by 0 days.

(21) Appl. No.: 17/709,502

(22) Filed: Mar. 31, 2022

(51) Int. Cl.
*G06F 3/041* (2006.01)
*G06F 1/16* (2006.01)

(52) U.S. Cl.
CPC .......... *G06F 1/1652* (2013.01); *G06F 1/1626* (2013.01); *G09G 2380/02* (2013.01)

(58) Field of Classification Search
CPC .... G06F 1/1626; G06F 1/1652; G06F 3/0412; G06F 3/044; G06F 3/045; G06F 3/046; G09G 2380/02; G09F 9/301
See application file for complete search history.

(56) References Cited

U.S. PATENT DOCUMENTS

| | | | | |
|---|---|---|---|---|
| 9,946,119 | B2* | 4/2018 | Fujita | G06F 1/1601 |
| 9,990,064 | B2* | 6/2018 | Zenner | G06F 3/0445 |
| 10,572,042 | B2* | 2/2020 | Li | G06F 3/04166 |
| 11,454,839 | B2* | 9/2022 | Yan | G02F 1/133512 |
| 2012/0162563 | A1* | 6/2012 | Lai | G02F 1/133512 |
| | | | | 349/58 |
| 2014/0267141 | A1* | 9/2014 | Yilmaz | G06F 3/0446 |
| | | | | 345/173 |
| 2015/0162387 | A1* | 6/2015 | Gu | G06F 3/0446 |
| | | | | 345/174 |
| 2015/0234430 | A1* | 8/2015 | Gupta | H05K 3/30 |
| | | | | 345/174 |
| 2016/0268349 | A1* | 9/2016 | Zhao | H01L 25/50 |
| 2017/0038874 | A1* | 2/2017 | Lin | G06F 3/0412 |
| 2018/0224985 | A1* | 8/2018 | Wu | B32B 15/04 |
| 2019/0080131 | A1* | 3/2019 | Lee | G06V 40/1306 |
| 2020/0185654 | A1* | 6/2020 | Luo | G06F 3/0443 |
| 2021/0359261 | A1* | 11/2021 | Jin | H01L 27/323 |

\* cited by examiner

*Primary Examiner* — Joe H Cheng

(57) ABSTRACT

A touch electronic paper display device includes an electronic paper display module, a lighting module, a touch sensing unit and a cover plate. The lighting module is disposed on the electronic paper display module and adhered to the electronic paper display module with a UV-curing solid optical clear adhesive. The lighting module includes a light strip and a light guide plate whose one side is adjacent to the light strip. The touch sensing unit is located on the lighting module. The cover plate is located on the touch sensing unit. A top surface of the cover plate is disposed with a UV-reflecting coating, and a periphery of a bottom surface thereof is disposed with a decorative bezel formed by an opaque or low light transmittance material.

8 Claims, 2 Drawing Sheets

SELF-ILLUMINATING TOUCH ELECTRONIC PAPER DISPLAY DEVICE

BACKGROUND

Technical Field

The invention relates to electronic paper display devices, particularly to a self-illuminating touch electronic paper display device.

Related Art

An electronic paper (e-paper) display, which has developed rapidly in recent years, has the characteristics of simulating paper such as flexibility, wide viewing angle, light weight, high resolution, high contrast and indoor and outdoor readability and the advantage of low power consumption, so it has gradually been widely used in electronic devices. In some applications, a touch panel is disposed on an electronic paper display to serve as an input device so that a user can use the touch panel to make an interactive operation with the electronic paper display to further expand convenience of using an electronic paper display.

In comparison with traditional CRT or LCD screens, e-paper displays use ambient light as a light source, so the burden on eyesight is smaller, and the damage to the eyes caused by long-term viewing can be reduced. However, if an electronic paper display is used in applications with insufficient ambient light, such as indoor space, the display quality will be greatly affected. Therefore, most electronic paper displays are equipped with a front light module to supplement the lighting to supplement the light intensity and maintain the display quality. The front light module is composed of a light source and a light guide plate. The material of the light guide plate is mostly PC and PMMA. Such materials are prone to air escape after being degraded by the external environment. The formation of air escape not only causes appearance defects, but also seriously affects the light guide efficiency. Furthermore, the current full lamination method of an electronic paper display and a front light module mainly uses solid optical clear adhesive (OCA) or liquid optical clear resin (OCR) as the adhesive medium for lamination, which is difficult to rework. The yield of products is impaired, and the unit price of electronic paper displays is high, and the inability of reworking will also cause significant cost pressure. In addition, the e-paper display itself is not resistant to ultraviolet (UV) rays. If it needs to be used outdoors, the strong UV in the outdoor environment will easily cause damage to the e-paper display. Therefore, when using the e-paper display outdoors, it is necessary to pay attention to anti-UV protection.

SUMMARY

An object of the invention is to provide a self-illuminating touch electronic paper display device, which makes an electronic paper display have a touch input function to allow a user to interact with screens shown on an electronic paper display and provides an auxiliary lighting to an electronic paper display so as to be used in a status without an external light source.

Another object of the invention is to provide a self-illuminating touch electronic paper display device, which has a protective mechanism of anti-UV to make the electronic paper display able to be used outdoors without damage.

To accomplish the above object, the invention provides a self-illuminating touch electronic paper display device, which includes an electronic paper display module, a lighting module, a touch sensing unit and a cover plate. The lighting module is disposed on the electronic paper display module and adhered to the electronic paper display module with a UV-curing solid optical clear adhesive. The lighting module includes a light strip and a light guide plate whose one side is adjacent to the light strip. The touch sensing unit is located on the lighting module. The cover plate is located on the touch sensing unit. A top surface of the cover plate is disposed with a UV-reflecting coating, and a periphery of a bottom surface thereof is disposed with a decorative bezel formed by an opaque or low light transmittance material.

Still another object of the invention is to provide a self-illuminating touch electronic paper display device, whose light guide of the lighting module is provided with a hard coat layer to prevent the light guide plate from forming air escape to cause worsening.

Yet another object of the invention is to provide a self-illuminating touch electronic paper display device, whose adhesion between the electronic paper display and the front light module is reworkable to increase the yield rate and reduce the cost pressure.

In the present invention, the light guide plate is made of polycarbonate (PC), polymethylmethacrylate (PMMA) or polyester (PET), the light guide plate is further disposed with a hard coat layer, the hard coat layer is directly formed on a surface of the light guide plate or is formed on a film adhered on the light guide plate.

In the present invention, the light strip comprises: a diffuser strip, having multiple diffusing points; a reflective plate, covering the diffuser strip; and a point light source, disposed on a lateral side of the diffuser strip.

In the present invention, the touch sensing unit is a capacitive touch sensor, a resistant touch sensor, an electromagnetic touch sensor, a sound wave touch sensor, a vibration wave touch sensor, an optical touch sensor or a combination thereof.

In the present invention, the cover plate is made of glass, polymethylmethacrylate (PMMA), polycarbonate (PC), polyester (PET), cyclic olefin copolymer (COC) or cyclic olefin polymer (COP).

Thereby, the present invention makes an electronic paper display have a touch input function to allow a user to interact with screens shown on an electronic paper display and provides an auxiliary lighting to an electronic paper display so as to be used in a status without an external light source.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
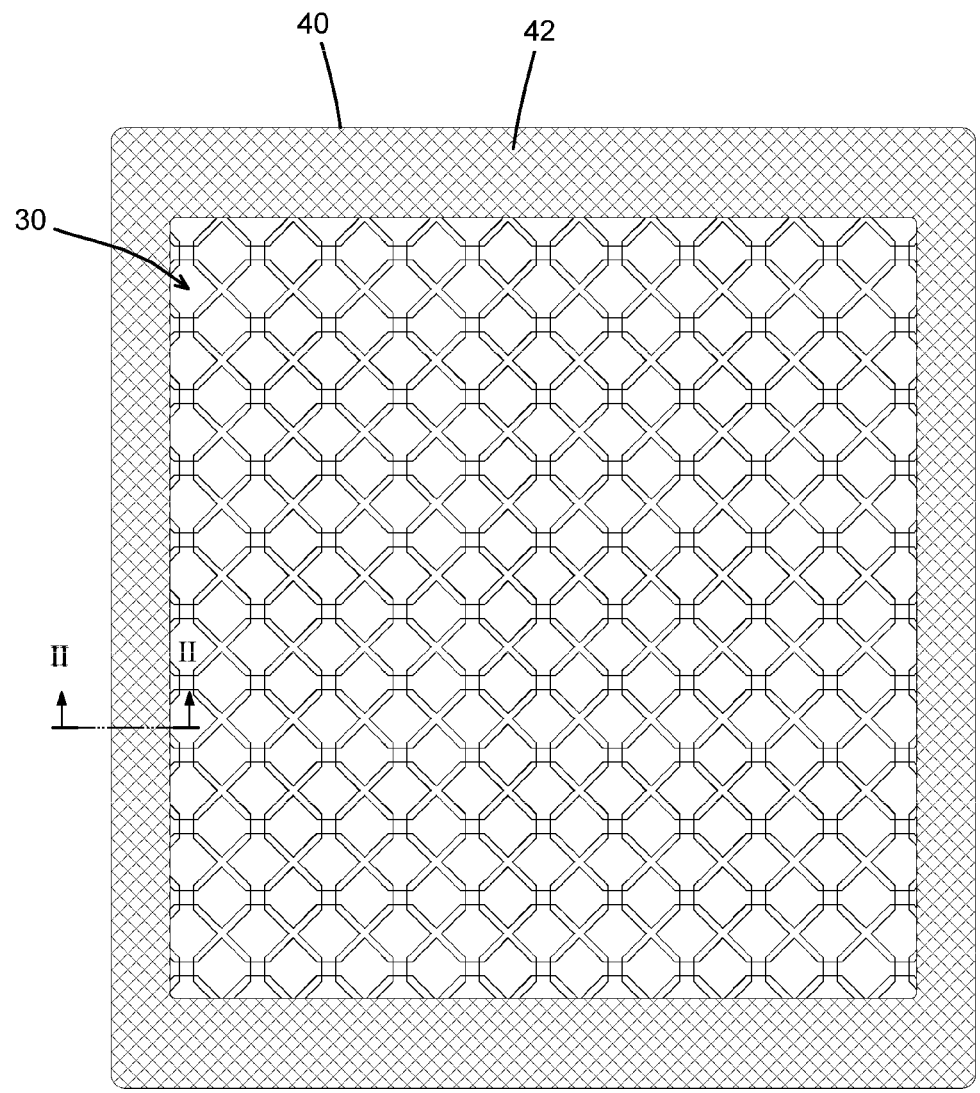
FIG. 1 is a schematic plan view of the invention.
Figure 2:
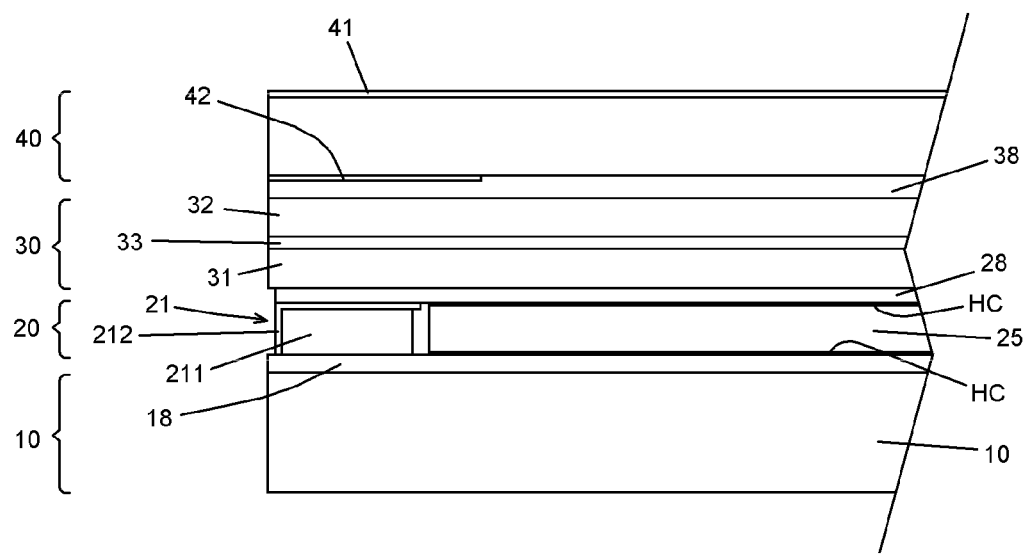
FIG. 2 is a cross-sectional view of the lamination of the invention along line II-II in FIG. 1.
Figure 3:
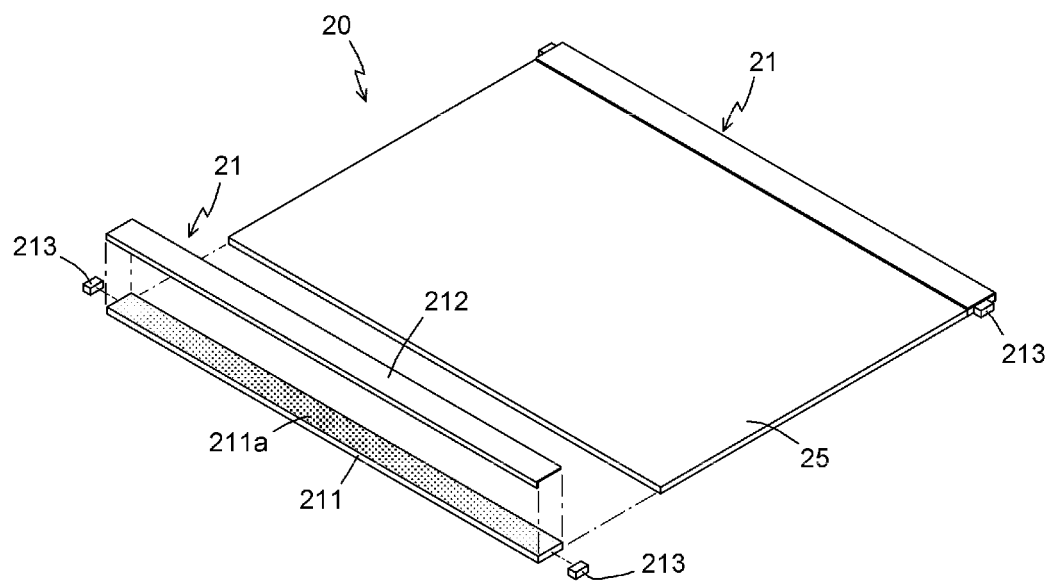
FIG. 3 is a perspective schematic view of the lighting module of the invention.

Please refer to FIGS. 1-3, which show a preferred embodiment of the self-illuminating touch electronic paper display device of the invention, which includes an electronic paper display module 10, a lighting module 20, a touch sensing unit 30 and a cover plate 40.

The electronic paper display module 10 is a reflective display that possesses low power consumption and flexibility and utilizes the electrophoretic technology or the cholesteric liquid crystal technology make image signals presented on a display surface of the electronic paper display module 10 by an image screen Please refer to FIGS. 2-3. The lighting module 20 includes two light strips 21 and a light guide plate 25. The light strip 21 includes a diffuser strip 211, a reflective plate 212 and two point light sources 213. The diffuser strip 211 is made by disposing multiple diffusing points 211a in a transparent substrate with a strip shape for converting the incident light from the pint light sources 213 into even light. The diffusing points 211 may be formed by a material whose refractive index is higher than that of the transparent substrate and may be cavities denting from a surface or protrusions projecting from a surface. By utilizing the sparse and dense distribution of the diffusing points 211a in the diffuser strip 211, the brightness on the diffuser strip 211 is uniformly distributed. The reflective plate 212 is used to cover a top side and a long edge to reflect the light of the covered portion into the diffuser strip 211 to reduce the loss of light dissipation. The point light sources 213 are light emitting diodes (LEDs) which are disposed on a lateral side of the diffuser strip 211.

A side of the light guide plate 25 is adjacent to the diffuser strip 211 to receive the light of the light strips 21 and to convert the light of the light strips 21 into a downward-emitting planar light source. The area of the light guide plate 25 is the same as a visible area of the electronic paper display module 10 to provide great illumination to the visible area of the electronic paper display module 10. The light guide plate 25 is made of, but not limited to, PC, PMMA or PET. Preferably, the light guide plat 25 is also disposed with the diffusing points 211a of the diffuser strip 211 to make the brightness of the light guide plate 25 evenly distributed. In addition, a surface of the light guide plate 25 is further disposed with a hard coat layer HC. The hard coat layer HC can reduce the air escape rate of the plastic substrate to prevent the air escape from causing worsening of the light guide plate 25. The method for disposing the hard coat layer HC on the light guide plate 25 may be to directly form the hard coat layer HC on the surface of the light guide plate 25, for example, spraying or sputtering the hard coat layer HC on the plastic substrate of the light guide plate 25 or soaking the plastic substrate in a chemical agent and then drying and hardening. Also, it may be a film having the hard coat layer HC, which is adhered on the light guide plate 25, for example, a PET film disposed with a hard coat layer HC is adhered on the light guide plate 25. Besides the hard coat layer HC on the light guide layer 25, the optical glue, i.e., OCA or OCR, may also be added with a material which can absorb the air escape to remove the air escape resulting in the worsened light guide plate 25.

The lighting module 20 is disposed on the electronic paper display module 10 and adhered to the electronic paper display module 10 with a UV-curing solid optical clear adhesive 18. The UV-curing solid optical clear adhesive 18 is used as the bonding medium between the lighting module 20 and the electronic paper display module 10, the UV-curing solid optical clear adhesive 18 has a lower adhesion before hardening, so the adhesion operation can be easily reworked before the final confirmation. This can improve the product yield and greatly reduce the cost loss of the adhesion process failure.

The touch sensing unit 30 is located on the lighting module 20 and adhered to the lighting module 20 with an optical adhesive 28. In the embodiment, the touch sensing unit 30 is a capacitive touch sensor and includes an X-axis sensing layer 31, a Y-axis sensing layer 32 and an insulative layer 33. The insulative layer 33 is sandwiched between the X-axis sensing layer 31 and the Y-axis sensing layer 32 to insulate the two sensing layers, and the X-axis sensing layer 31 and the Y-axis sensing layer 32 are separately grounded and connected to a control circuit (not shown). The touch action area of the touch sensing unit 30 has a size corresponding to the visible area the electronic paper display module 10 to make an image shown on the electronic paper display module 10 serve as a touch input device, so that a user can use the touch sensing unit 30 to implement an interactive operation with the image provided by the electronic paper display module 10 to form a friendly human-machine interface. Besides a capacitive touch sensor, the touch sensing unit 30 may adopt, but not limited to, a resistant touch sensor, an electromagnetic touch sensor, a sound wave touch sensor, a vibration wave touch sensor, an optical touch sensor or a combination of two or more thereof.

The cover plate 40 is located on the touch sensing unit 10 and adhered to the touch sensing unit 10 with an optical adhesive 38. The cover plate 40 is a thin plate with great mechanic strength and high light transmittance and made of, but not limited to, glass, polymethylmethacrylate (PMMA), polycarbonate (PC), polyester (PET), cyclic olefin copolymer (COC) or cyclic olefin polymer (COP). A top surface of the cover plate 40 is disposed with a UV-reflecting coating 41 for reflecting and isolating UV light to prevent UV light from entering the electronic paper display module 10 to cause damage. Besides the UV-reflecting coating 41 on the cover plate 40, the optical adhesive 28, 38 may also be added with a material which can absorb UV light to isolate UV light resulting in shortening the service life of the electronic paper display module 10. In addition, a periphery of a bottom surface of the cover plate 4 is disposed with a decorative bezel 42 formed by an opaque or low light transmittance film layer made by an insulative material. The insulative material may adopt, but not limited to, ink or photoresist. The insulative material is a film layer with a thickness above 15 μm, which is formed on a periphery of a bottom surface of the cover plate 4 by printing, sputtering or spraying. The decorative bezel 42 of the cover plate 4 is located on a peripheral circuit area of the touch sensing unit 30, the electronic paper display module 10 and the light strips 21 on sides of the lighting module 20 to improve beauty of the whole device.

While this disclosure has been described by means of specific embodiments, numerous modifications and variations could be made thereto by those skilled in the art without departing from the scope and spirit of this disclosure set forth in the claims.

What is claimed is:

1. A self-illuminating touch electronic paper display device comprising:
   an electronic paper display module;
   a lighting module, disposed on the electronic paper display module, adhered to the electronic paper display module with a UV-curing solid optical clear adhesive, and comprising a light strip and a light guide plate whose one side is adjacent to the light strip;
   a touch sensing unit, located on the lighting module; and
   a cover plate, located on the touch sensing unit, a top surface of the cover plate being disposed with a UV-reflecting coating, and a periphery of a bottom surface thereof being disposed with a decorative bezel formed by an opaque or low light transmittance material.

2. The self-illuminating touch electronic paper display device of claim 1, wherein the light strip comprises:
   a diffuser strip, having multiple diffusing points;
   a reflective plate, covering the diffuser strip; and
   a point light source, disposed on a lateral side of the diffuser strip.

3. The self-illuminating touch electronic paper display device of claim 1, wherein the light guide plate is made of polycarbonate (PC), polymethylmethacrylate (PMMA) or polyester (PET).

4. The self-illuminating touch electronic paper display device of claim 3, wherein the light guide plate is further disposed with a hard coat layer.

5. The self-illuminating touch electronic paper display device of claim 4, wherein the hard coat layer is directly formed on a surface of the light guide plate.

6. The self-illuminating touch electronic paper display device of claim 4, wherein the hard coat layer is formed on a film adhered on the light guide plate.

7. The self-illuminating touch electronic paper display device of claim 1, wherein the touch sensing unit is a capacitive touch sensor, a resistant touch sensor, an electromagnetic touch sensor, a sound wave touch sensor, a vibration wave touch sensor, an optical touch sensor or a combination thereof.

8. The self-illuminating touch electronic paper display device of claim 1, wherein the cover plate is made of glass, polymethylmethacrylate (PMMA), polycarbonate (PC), polyester (PET), cyclic olefin copolymer (COC) or cyclic olefin polymer (COP).

* * * * *